United States Patent Office 3,161,826
Patented Dec. 15, 1964

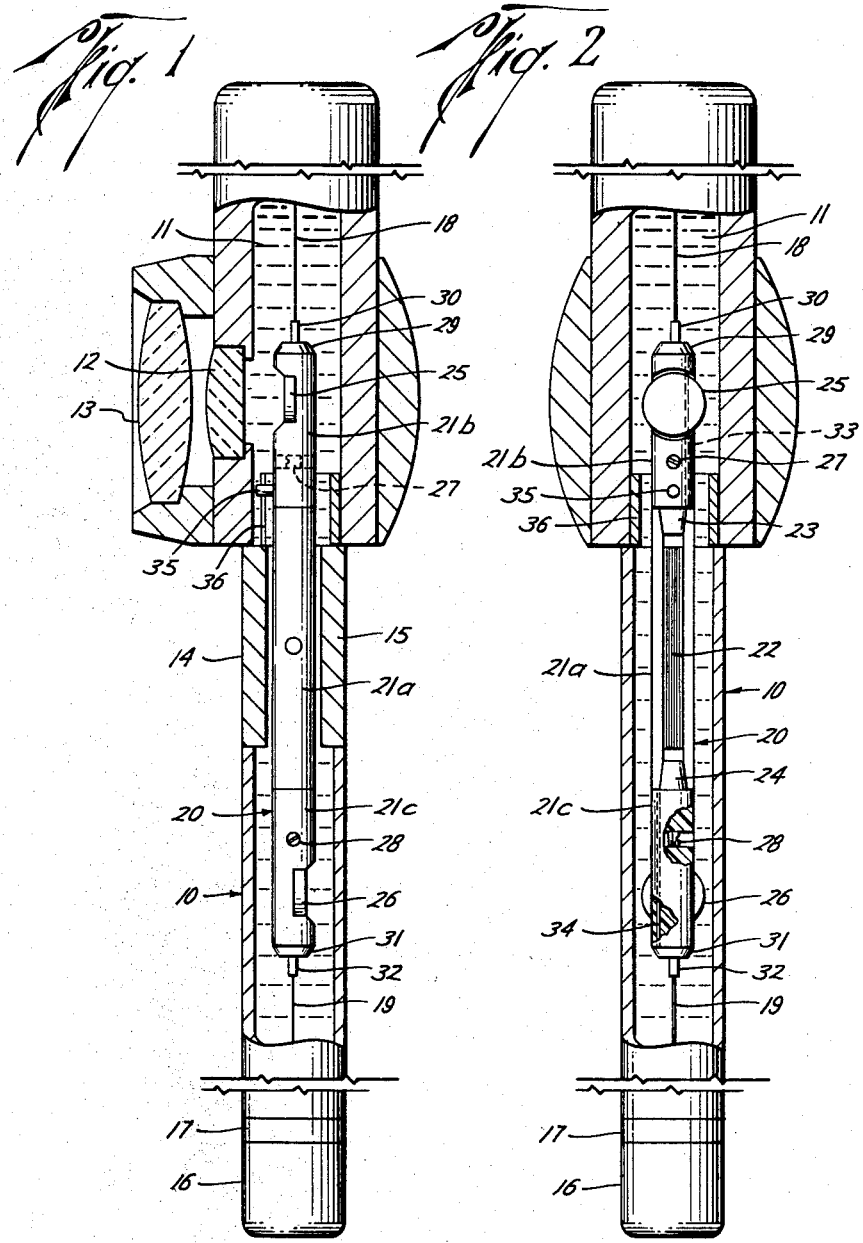
Maxime Felix Benoit Picard
INVENTOR.

3,161,826
FLUID IMMERSED MIRROR GALVANOMETER
WITH BALANCED SUSPENSION ASSEMBLY
Maxime Felix Benoit Picard, Levallois, France, assignor to Société de Prospection Electrique, Procédés Schlumberger, Paris, France, a corporation of France
Filed May 8, 1961, Ser. No. 108,381
Claims priority, application France May 12, 1960
9 Claims. (Cl. 324—97)

This invention relates to galvanometers and, particularly, to structures for use in mirror-type suspension galvanometers.

It is frequently desirable to have a mirror-type galvanometer which is relatively insensitive to external vibrations and shocks. One manner of accomplishing this purpose is to suspend the galvanometer suspension assembly in a liquid-filled housing wherein the specific gravity of the liquid which fills the housing is equal to the effective or average specific gravity of the suspension assembly. This technique is described in Patent No. 2,623,083, granted to Schlumberger and Picard on December 23, 1952 and in Patent No. 2,623,084, granted to Schlumberger, Picard and Barreteau on December 23, 1952.

While galvanometers constructed in accordance with the teachings of these patents have been found to provide substantial improvements over prior types of galvanometers, it is nevertheless desirable to further improve the insensitivity of the galvanometer to various external disturbances. In particular, it is desirable to provide a galvanometer which more accurately maintains its insensitivity to external shocks and vibrations over a wider range of operating temperatures. It is further desirable to provide relatively simple and inexpensive forms of galvanometer structures which may be readily and accurately adjusted to satisfy the various conditions which render the galvanometer insensitive to external shocks and vibrations.

To this end, the present invention comprises an improved suspension assembly for a galvanometer wherein the suspension assembly is suspended inside a liquid-filled housing. This improved suspension assembly includes an elongated body member of nonmagnetic material. It further includes a coil winding mounted on the body member so that the center of the coil coincides with the center of gravity of the body member. The suspension assembly also includes a mirror mounted on the body member adjacent one end thereof and means mounted on the body member adjacent the other end thereof for counterbalancing the mirror. In addition, the suspension assembly includes terminal means located at the two ends of the body member for enabling suspension of the body member in the galvanometer housing.

For a better understanding of the present invention, together with other and further objects thereof, reference is had to the following description taken in connection with the accompanying drawings, the scope of the invention being pointed out in the appended claims.

Referring to the drawings:

FIG. 1 is an elevational view of a galvanometer housing with portions of the housing cut away to reveail the details of a novel suspension assembly located in the interior thereof; and FIG. 2 shows a partially cut-away view of the galvanometer housing taken at 90 degrees with respect to the view of FIG. 1.

Referring to FIGS. 1 and 2 of the drawings, there is shown an elongated fluid-tight galvanometer housing 10. This housing 10 is filled with a liquid 11 having a known specific gravity. A pair of lenses 12 and 13 provide an optical window whereby a beam of light may be passed into and returned from the interior of the housing 10. A pair of magnetic pole pieces 14 and 15 are located in slots on opposite sides of the housing 10. These pole pieces 14 and 15 cooperate with an external magnet system during the usage of the galvanometer to provide a uniform magnetic field across the interior of the galvanometer housing intermediate the pole pieces 14 and 15. An end portion 16 of the housing 10 is electrically insulated from the remainder of the housing by means of a section 17 of nonconductive material so that the end portion 16 may be used as an electrical terminal for the galvanometer.

Suspended within the interior of the galvanometer housing 10 by means of suspension wires 18 and 19 is a novel suspension assembly 20 constructed in accordance with the present invention. This suspension assembly includes an elongated generally-cylindrical and symmetrical body member having three parts 21a, 21b and 21c. Part 21a is a bobbin member around which is wound a coil winding 22. Part 21b is an end piece having a reduced-diameter tapered projection 23 at the lower end thereof. This tapered portion 23 is glued or otherwise secured to the upper end of the bobbin member 21a. The third part of the body member, namely the part 21c is another end piece having a tapered projection 24 which is glued to the lower end of the bobbin member 21a. The bobbin member 21a, together with the two end pieces 21b and 21c, are formed of a plastic material having a specific gravity which is lower than the specific gravity of the liquid 11. The bobbin member 21a and the end pieces 21b and 21c are constructed so that the body member as a whole is symmetrical with respect to its midpoint and so that the center of gravity of the body member coincides with this physical mid-point. Also, the coil winding 22 is located symmetrically with respect to the mid-point of the body member formed by the parts 21a, 21b and 21c so that the center of thrust produced on this coil winding 22 when it is located in a uniform magnetic field and energized with electrical current will coincide with the center of gravity of the body member.

The suspension assembly 20 also includes a mirror 25 mounted on the body member end piece 21b. Means, in the form of a second mirror 26, is mounted on the body member end piece 21c for counterbalancing the first mirror 25. The two mirrors 25 and 26 are located symmetrically with respect to the mid-point of the body member so as not to shift the center of gravity of the suspension assembly 20 as a whole.

Two threaded balancing weights 27 and 28 are located at right angles to one another in suitable threaded passageways in the two end pieces 21b and 21c.

Attached to the upper end of the end piece 21b is a metal terminal member 29 having a metal projection 30 protruding from the upper end thereof. In a similar manner, there is secured to the lower end of the end piece 21c a metal terminal member 31 having a metal projection 32 extending from the lower end thereof. The metal projections 30 and 32 are welded to the corresponding ones of the suspension wires 18 and 19. Suspension wire 18 is secured to the upper end of the galvanometer housing 10, while the lower suspension wire 19 is secured to the end portion 16 of the housing 10. In this manner, the suspension assembly 20 is suspended so that the upper mirror 25 is adjacent the lens 12 and the coil 22 is adjacent the pole pieces 14 and 15.

The lead wires for the coil winding 22 are brought out to the metal terminal members 29 and 31 by way of small passageways 33 and 34 which pass through the interior of the respective end pieces 21b and 21c. These lead wires are welded to the terminal members 29 and 31.

In order to limit the rotation of the suspension assembly 20, a small stud member 35 is attached to and projects from the upper end piece 21b. This stud member 35 cooperates with a bushing member 36 which is secured to the galvanometer housing 10 and which has a gap therein opposite the location of the stud member 35 so as to limit the movement of the stud member 35 to the angle defined by this gap.

In order that the galvanometer will not be sensitive to external vibrations and shocks, it is necessary that the effective or average specific gravity of the suspension assembly 20 as a whole be equal to the specific gravity of the liquid 11 which fills the galvanometer housing. When this condition obtains, then the weight of the suspension assembly matches the weight of the displaced liquid and, consequently, no movement of the suspension assembly relative to the liquid is caused by external vibrations and shocks. As is seen from the foregoing, the suspension assembly 20 includes various parts made from different materials having different specific gravities. The specific gravity of the plastic material forming the three parts 21a, 21b and 21c of the body member have a specific gravity less than that of the liquid 11. Other of the parts, however, such as the coil winding 22, the mirrors 25 and 26 and the metal terminal members 29 and 31 have specific gravities which are greater than that of the liquid 11. The sizes and compositions of the various parts forming the suspension assembly 20 are selected so that the average specific weight of the suspension assembly 20 as a whole is equal to that of the fluid 11. A final adjustment in obtaining the desired balance of the specific gravities is obtained by an appropriate selection for the composition of the threaded balancing weights 27 and 28. The provision of this final adjustment eases somewhat the restrictions on the design of the remainder of the assembly and thus simplifies the design and construction thereof.

In order that the balance between the specific gravity of the liquid 11 and the average specific gravity of the suspension assembly 20 will be affected as little as possible by temperature variations, the compositions of the various materials are also selected so that the change in specific gravity with temperature of the suspension assembly will remain in step with the change in the specific gravity of the liquid 11 and thereby maintain the desired balance.

A further reduction in the sensitivity to changes in temperature is obtained by providing a balanced symmetrical form of suspension assembly. In particular, the center of gravity of the suspension assembly is made to accurately coincide with the center of thrust produced on the coil winding during electrical operation and both are made to fall on the axis of rotation of the suspension asseembly. Consequently, the symmetry and balance of the system is maintained in spite of the different expansion coefficients and specific gravities of the various materials forming the suspension assembly 20. In particular, adjustment of the relative positions of the threaded balancing weights 27 and 28 enables the center of gravity of the suspension assembly 20 to be accurately adjusted to coincide with the center of thrust produced on the coil winding 22 during the operation of the galvanometer. Once this coincidence is obtained, then, if necessary, the coincident centers of gravity and thrust are brought onto the axis of rotation of the suspension assembly 20 through a slight bending of the metal projections 30 and 32 to which are welded the suspension wires 18 and 19. The provision of these adjustable features enables an accurate balance to be obtained in a relatively inexpensive manner.

While there has been described what is at present considered to be a preferred embodiment of this invention, it will be obvious to those skilled in the art that various changes and modifications may be made therein without departing from the invention, and it is, therefore, intended to cover all such changes and modifications as fall within the true spirit and scope of the invention.

What is claimed is:

1. In a galvanometer having a liquid-filled housing and a suspension assembly suspended therein, an improved suspension assembly comprising: an elongated cylindrical body member of non-magnetic material; a coil winding mounted on the body member within the cylindrical confines thereof and so that the center of the coil coincides with the center of gravity of the body member; a mirror mounted on the body member adjacent one end thereof and to one side of the longitudinal center axis of the body member; means mounted on the body member adjacent the other end thereof on the other side of the longitudinal axis of the body member for counterbalancing the mirror; a pair of balancing weights adjustably mounted in the body member, one near one end and the other near the other end thereof, for aligning the center of gravity of the suspension assembly with the center of thrust of the coil winding; and terminal means located at the two ends of the body member for enabling suspension of the body member in the galvanometer housing.

2. In a galvanometer having a liquid-filled housing and a suspension assembly suspended therein, an improved suspension assembly comprising: an elongated generally-cylindrical and symmetrical body member of plastic material having a middle bobbin portion intermediate a pair of like end pieces; a coil winding wound on the bobbin portion of the body member so that the center of the coil coincides with the center of gravity of the body member; a mirror mounted on the body member adjacent one end thereof and to one side of the longitudinal center axis of the body member; means mounted on the body member adjacent the other end thereof for counterbalancing the mirror; a pair of balancing weights adjustably mounted in different ones of the end pieces for aligning the center of gravity of the suspension assembly with the center of thrust of the coil winding; and terminal means located at the two ends of the body member for enabling suspension of the body member in the galvanometer housing.

3. In a galvanometer having a liquid-filled housing and a suspension assembly suspended therein, an improved suspension assembly comprising: an elongated body member of non-magnetic material; a coil winding mounted on the body member so that the center of the coil coincides with the center of gravity of the body member; a first mirror mounted on the body member adjacent one end thereof and to one side of the longitudinal center axis of the body member and adapted for use in deflecting a light beam; a second mirror mounted on the body member adjacent the other end thereof and symmetrically positioned on the opposite side of the center of gravity of the body member from the first mirror for counterbalancing the first mirror, the first and second mirrors being symmetrically located with respect to the center of gravity of the body member; and terminal means located at the two ends of the body member for enabling suspension of the body member in the galvanometer housing.

4. In a galvanometer having a liquid-filled housing and a suspension assembly suspended therein, an improved suspension assembly comprising: an elongated cylindrical body member of non-magnetic material; a coil winding mounted on the body member within the cylindrical confines thereof and so that the center of thrust produced on the coil during the electrical operation thereof coincides with the center of gravity of the body member; a mirror mounted on the body member adjacent one end thereof and to one side of the longitudinal center axis of the body member; means mounted on the body member adjacent the other end thereof and symmetrically positioned on the opposite side of the center of gravity of the body member from the mirror for counterbalancing the mirror; a pair of balancing weights adjustably mounted in the body member, one near one end and the other near the other end thereof, for aligning the center of gravity of the suspension assembly with the center of thrust of the coil winding; and terminal means located at the two ends of the body member for enabling suspension of the body member in the galvanometer housing.

5. In a galvanometer having a liquid-filled housing and a suspension assembly suspended therein, an improved suspension assembly comprising: an elongated body member of non-magnetic material; a coil winding mounted on the body member so that the center of thrust produced on the coil during the electrical operation thereof coincides approximately with the center of gravity of the body member; a mirror mounted on the body member adjacent one end thereof and to one side of the longitudinal center axis of the body member; means mounted on the body member adjacent the other end thereof for counterbalancing the mirror; a pair of balancing weights adjustably mounted in the body member, one near one end and the other near the other end thereof, these weights being adapted to be moved at right angles to one another and to the longitudinal axis of the body member for accurately aligning the center of gravity of the suspension assembly with the center of thrust of the coil winding; and terminal means located at the two ends of the body member for enabling suspension of the body member in the galvanometer housing.

6. In a galvanometer having a liquid-filled housing and a suspension assembly suspended therein, an improved suspension assembly comprising: an elongated body member of nonmagnetic material; a coil winding mounted on the body member so that the center of the coil coincides with the center of gravity of the body member; a mirror mounted on the body member adjacent one end thereof and to one side of the longitudinal center axis of the body member; means mounted on the body member adjacent the other end therefor for counterbalancing the mirror; a pair of balancing weights adjustably mounted in the body member, one near one end and the other near the other end thereof, for aligning the center of gravity of the suspension assembly with the center of thrust of the coil winding; and terminal means located at the two ends of the body member and including metal projecting portions for enabling suspension of the body member in the galvanometer housing, these metal projecting portions being adapted to be bent for aligning the center of gravity of the suspension assembly with the axis of rotation of the suspension assembly.

7. In a galvanometer having a liquid-filled housing and a suspension assembly suspended therein, an improved suspension assembly comprising: an elongated body member of nonmagnetic material; a coil winding mounted on the body member so that the center of thrust produced on the coil during the electrical operation thereof coincides approximately with the center of gravity of the body member; a mirror mounted on the body member adjacent one end thereof and to one side of the longitudinal center axis of the body member; means mounted on the body member adjacent the other end thereof for counterbalancing the mirror; a pair of balancing weights adjustably mounted in the body member, one near one end and the other near the other end thereof, these weights being adapted to be moved at right angles to one another and to the longitudinal axis of the body member for accurately aligning the center of gravity of the suspension assembly with the center of thrust of the coil winding; and terminal means located at the two ends of the body member and including projecting portions for enabling suspension of the body member in the galvanometer housing, these projecting portions being adapted to be bent for aligning the center of gravity of the suspension assembly with the axis of rotation of the suspension assembly.

8. In a galvanometer having a liquid-filled housing and a suspension assembly suspended therein, an improved suspension assembly comprising: an elongated cylindrical body member of nonmagnetic material; a coil winding mounted on the body member within the cylindrical confines thereof and so that the center of the coil coincides with the center of gravity of the body member; a mirror mounted on the body member adjacent one end thereof and to one side of the longitudinal center axis of the body member; means mounted on the body member adjacent the other end thereof and symmetrically positioned on the opposite side of the center of gravity of the body member from the mirror for counterbalancing the mirror; a pair of balancing weights adjustably mounted in the body member, one near one end and the other near the other end thereof, for aligning the center of gravity of the suspension assembly with the center of thrust of the coil winding; and terminal means located at the two ends of the body member for enabling suspension of the body member in the galvanometer housing; the composition and dimensions of the various elements comprising the suspension assembly being selected and proportioned so that the effective specific gravity of the suspension assembly as a whole is equal to the specific gravity of the liquid which fills the remainder of the galvanometer housing.

9. In a galvanometer having a liquid-filled housing and a suspension assembly suspended therein, an improved suspension assembly comprising: an elongated cylindrical body member of nonmagnetic material; a coil winding mounted on the body member within the cylindrical confines thereof and so that the center of the coil coincides with the center of gravity of the body member; a mirror mounted on the body member adjacent one end thereof and to one side of the longitudinal center axis of the body member; means mounted on the body member adjacent the other end thereof and symmetrically positioned on the opposite side of the center of gravity of the body member from the mirror for counterbalancing the mirror; terminal means located at the two ends of the body member for enabling suspension of the body member in the galvanometer housing; and at least one balancing weight mounted in the body member, the composition and dimensions of this balancing weight being selected so that the effective specific gravity of the suspension system is equal to the specific gravity of the liquid which fills the remainder of the galvanometer housing.

References Cited in the file of this patent

UNITED STATES PATENTS

| | | |
|---|---|---|
| 602,527 | Sullivan | Apr. 19, 1898 |
| 2,045,677 | Schock | June 30, 1936 |
| 2,149,244 | Lewis | Feb. 28, 1939 |
| 2,150,398 | Paulson | Mar. 14, 1939 |
| 2,234,430 | Ellis | Mar. 11, 1941 |
| 2,623,083 | Schlumberger | Dec. 23, 1952 |